No. 865,919. PATENTED SEPT. 10, 1907.
S. & R. E. LEETHAM.
AUTOMATIC FEED WEIGHING AND PACKING APPARATUS.
APPLICATION FILED APR. 30, 1906.

6 SHEETS—SHEET 1.

Witnesses. Inventors.

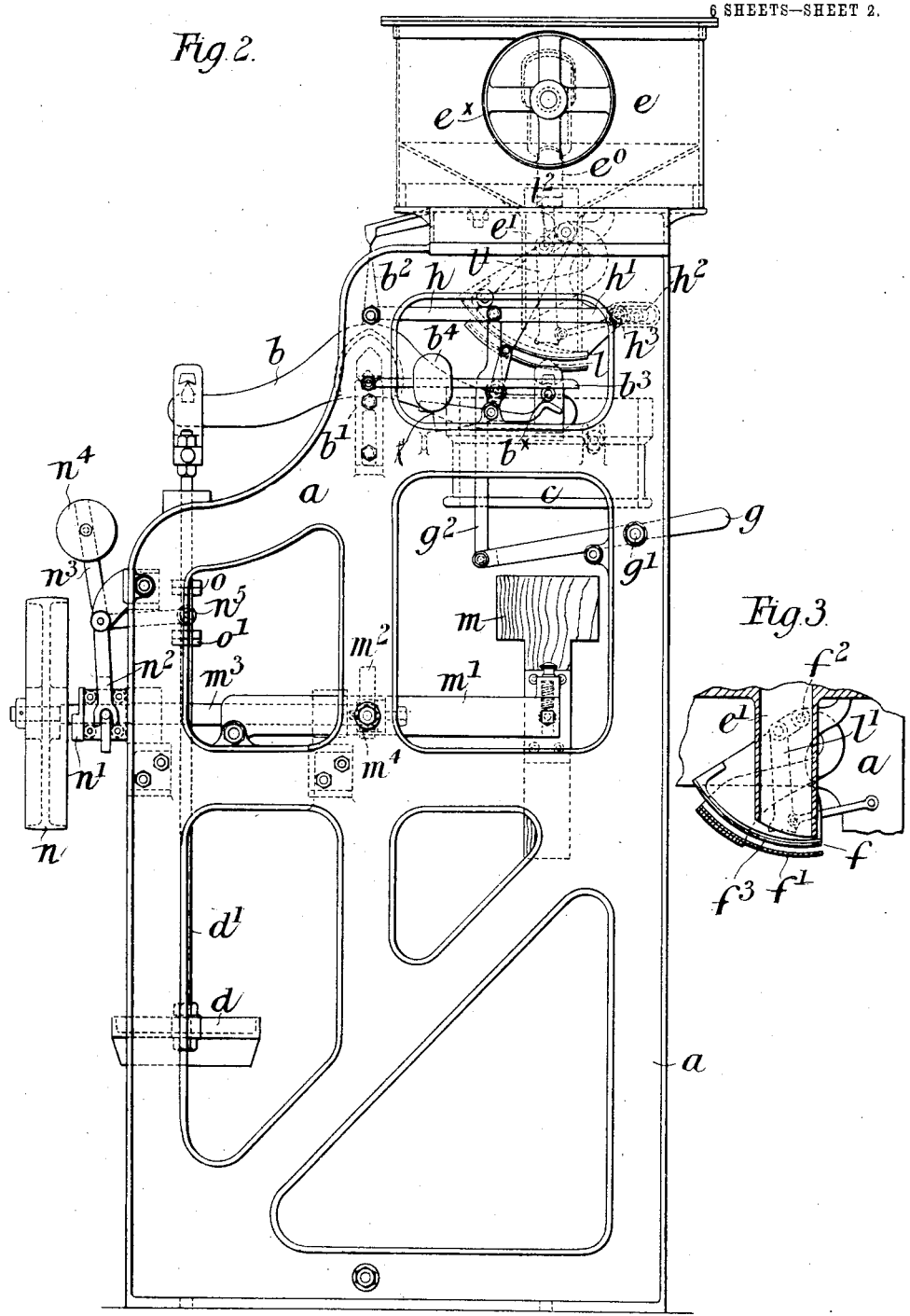

No. 865,919. PATENTED SEPT. 10, 1907.
S. & R. E. LEETHAM.
AUTOMATIC FEED WEIGHING AND PACKING APPARATUS.
APPLICATION FILED APR. 30, 1906.
6 SHEETS—SHEET 5.

Witnesses
Inventors

No. 865,919.

PATENTED SEPT. 10, 1907.

S. & R. E. LEETHAM.
AUTOMATIC FEED WEIGHING AND PACKING APPARATUS.
APPLICATION FILED APR. 30, 1906.

6 SHEETS—SHEET 6.

Witnesses.
J. K. Moore
F. H. Hubbard

Inventors
Sidney Leetham
Richard Edwin Leetham
By Whitaker & Prevost Attys

UNITED STATES PATENT OFFICE.

SIDNEY LEETHAM AND RICHARD EDMUND LEETHAM, OF YORK, ENGLAND.

AUTOMATIC FEED WEIGHING AND PACKING APPARATUS.

No. 865,919.　　　　　Specification of Letters Patent.　　　　　Patented Sept. 10, 1907.

Application filed April 30, 1906. Serial No. 314,573.

*To all whom it may concern:*

Be it known that we, SIDNEY LEETHAM, residing at Elmbank, York, and RICHARD EDMUND LEETHAM, residing at Bootham, York, both in the county of York, England, subjects of the King of Great Britain, have invented new and useful Improvements in Automatic Feed Weighing and Packing Apparatus, of which the following is a specification.

This invention relates to improvements in apparatus for automatically feeding flour or other like material into sacks and weighing the same and to apparatus of the kind in which the flour is packed into the sack until the predetermined weight is almost attained, whereupon the packing is automatically stopped while the remaining quantity of flour required to make up the definite weight is quietly fed into the sack, when the feed is completely stopped by the movement of the beam of the weighing machine.

Figure 1:
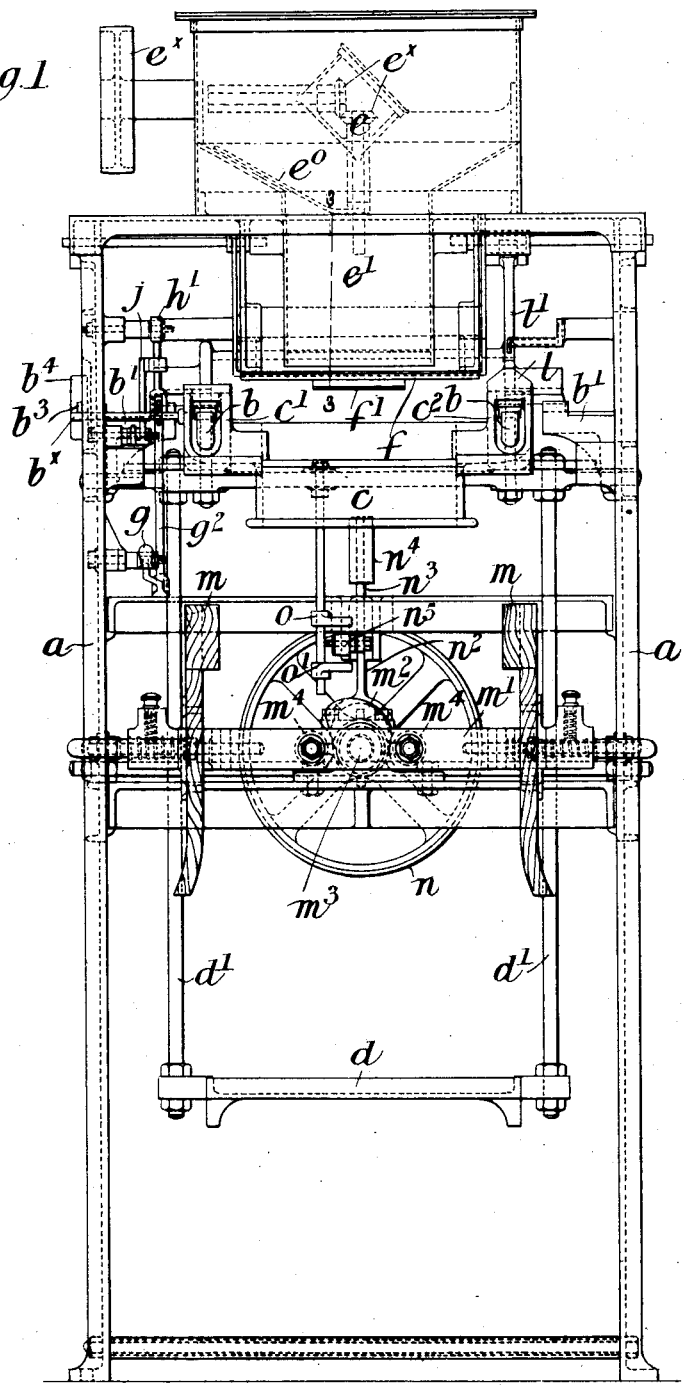
Figure 4:
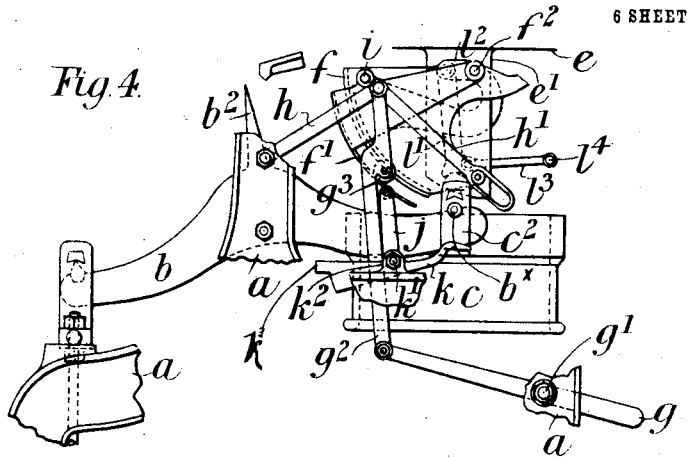
Figure 5:
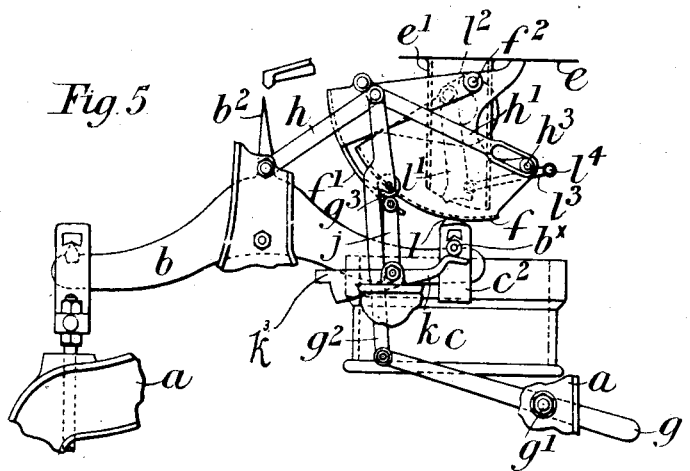
Figure 6:
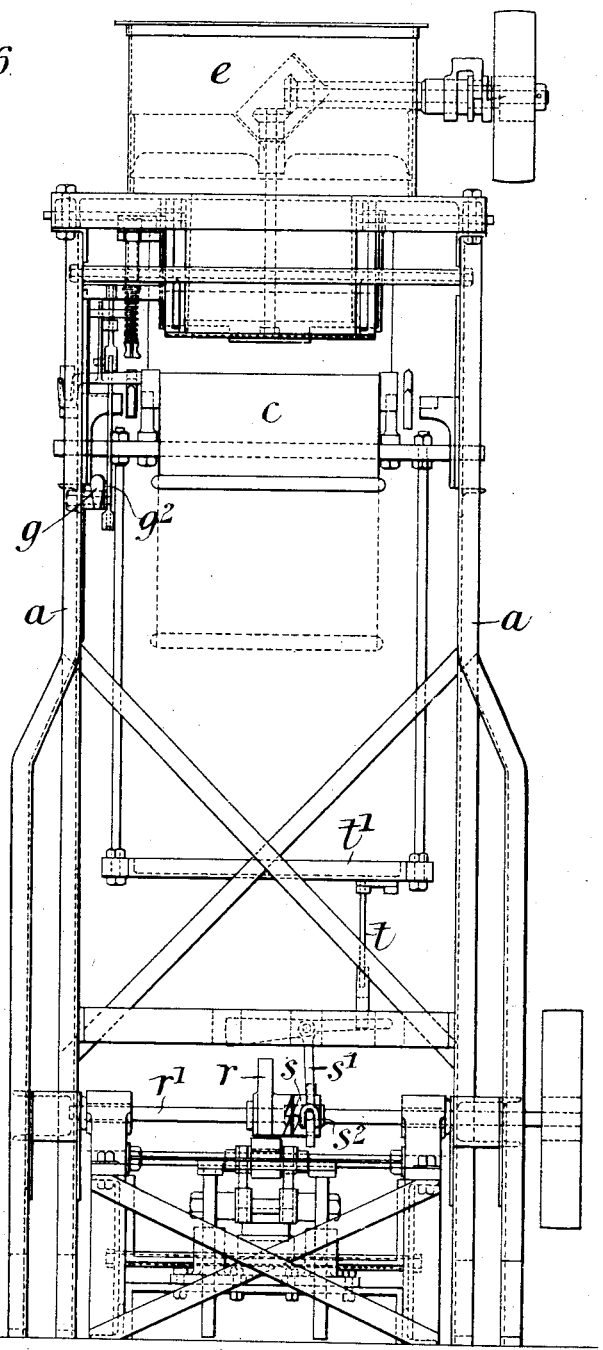
Figure 7:
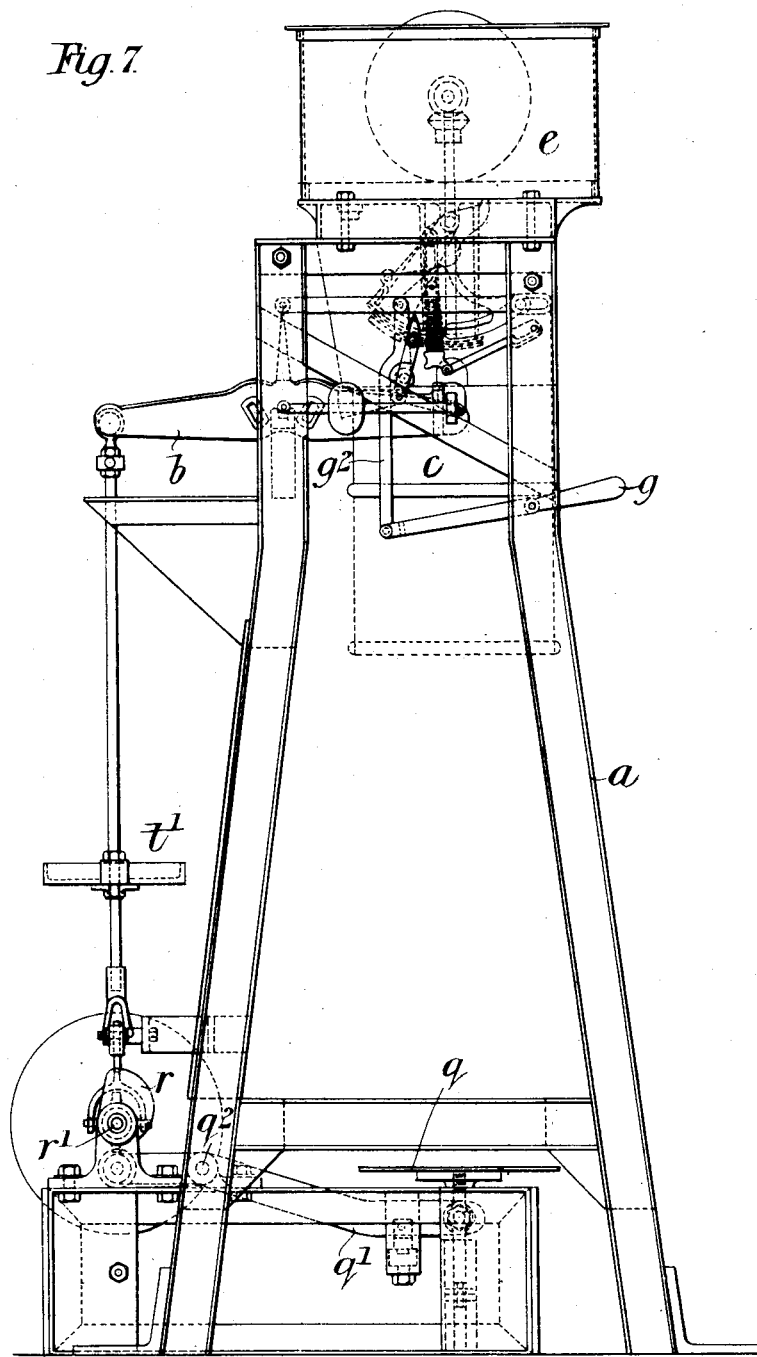
Figure 8:
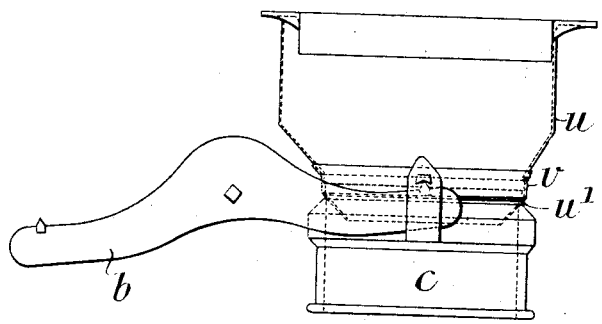
Figure 9:
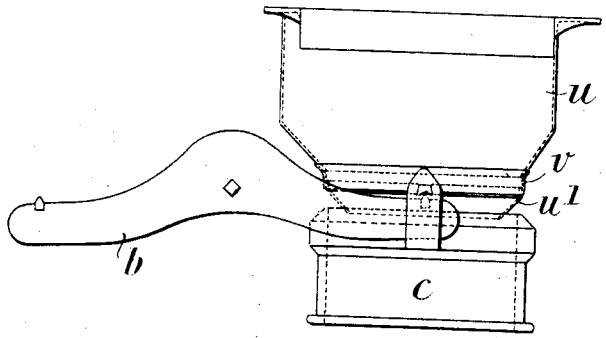

In the accompanying drawings:—Figure 1 is a front elevation of a suitable form of machine constructed according to the invention. Fig. 2 is a side elevation thereof. Fig. 3 is a section on the line 3—3, Fig. 1. Fig. 4 is a detail view of a portion of my device showing both feed valves open. Fig. 5 is a view similar to Fig. 4 but showing the inner valve closed. Fig. 6 is a front elevation illustrating a modified construction of machine. Fig. 7 is a side elevation thereof, and Figs. 8 and 9 are views of a detail hereinafter described.

Referring first to the arrangement illustrated in Figs. 1 to 5, $a$, $a$ are the side frames of the machine and $b$ is an equal-armed beam having double sides, which is supported upon the bearings $b^1$, $b^1$ in the side frames $a$, $a$ of the machine, $b^2$ being the cock of the beam. $c$ is the holder to which the empty sack to be filled is attached by any suitable means, such for example, as by a strap, the said holder being suspended from the beam $b$ by means of the extension pieces $c^1$ and $c^2$. The weight of the holder $c$ and its parts is exactly counter-balanced by means of standard weights placed upon the weight-plate $d$ attached to the lower end of the rods $d^1$ suspended from the other arm of the beam $b$. Upon a pin $b^\times$ on the inner arm of the beam there bears a lever $b^3$ upon which is adjustably mounted a weight $b^4$ which can be moved so as to exactly compensate for the flour which is in suspension between the feed and the sack when the supply is finally cut off.

$e$ is the feed hopper from which the flour to be packed and weighed passes into the chute $e^1$ arranged above the sack-holder $c$; $e^0$ is a stirrer for breaking the arch of flour in the hopper $e$, the said stirrer being revolved by the pulley and gearing $e^\times$. The supply of flour from the chute $e^1$ is controlled by means of valve mechanism comprising the two concentric valves $f$ and $f^1$ which are both mounted upon common pivots $f^2$, $f^2$ held in the side frames $a$, $a$ of the apparatus. The outer valve $f^1$ is solid, while the inner valve $f$ is provided with an aperture $f^3$ (see Fig. 3). These valves, when the apparatus is not in use or when a sack has been packed occupy the position indicated in Figs. 1 and 2, that is to say, the position in which they cut off the supply of flour from the chute $e^1$ to the sack.

The machine is put into the operative position by means of the starting-lever $g$ which is pivoted at $g^1$ to one of the side frames $a$ of the machine and is connected at its inner end to the lower end of a heavy connecting-rod $g^2$ which is hinged at its upper end to the inner ends of a pair of toggle-links $h$, $h^1$; the toggle-link $h$ is pivoted at its other end to the frame $a$ while the other end of the toggle link $h^1$ is made with a slot $h^2$ engaging a pin $h^3$ upon the valve $f$. When the starting-lever $g$ is depressed the toggle joint is broken and the links $h$, $h^1$ are pushed into the position shown in Fig. 4, the link $h$ bearing against a projection $i$ upon the valve $f^1$ and so raising it to the position shown in Figs. 4 and 5. The toggle-links are retained in this position by a roller $g^3$ upon the connecting rod $g^2$ which bears upon the upper end of an arm $j$ of a trigger-device $k$ pivoted at $k^1$ to a bracket $k^2$ on one of the side frames $a$ of the apparatus said arm $j$ being thrown into place by the falling of the weighted end $k^3$ of the trigger device $k$. When the toggle-links $h$, $h^1$ are raised into this position the beam $b$ drops into the position shown in Fig. 4 by reason of the weights upon the weight-plate $d$ and a projection $l$ upon one of the extensions $c^2$ of the sackholder $c$ strikes the lower end of a pendent link $l^1$ which is hinged at its upper end to a link $l^2$ connected to the valve $f$, and at its lower end to a rod $l^3$ pivoted at $l^4$ to the frame of the apparatus.

With this construction it is obvious that until the toggle is broken the inner valve is locked in a closed position and as the link $l'$ only moves with said valve and bears upon a projection $l$ on the sack holder, it is also obvious that the beam is prevented from falling under the influence of the weights until the inner valve and link $l'$ are permitted to rise. When, however, the toggle is broken by the starting lever the inner valve is released whereupon the link $l'$ is also permitted to rise thus leaving the beam free to fall under the influence of its weights.

The packing of the sack is effected by means of the beaters or blocks $m$, $m$ which are adjustably mounted in a reciprocating support $m^1$, adapted to be operated by means of the cam $m^2$ mounted upon the driving shaft $m^3$. The cam $m^2$ bears against rollers $m^4$ provided in the reciprocating support $m^1$, and as it rotates positively operates the said support $m^1$ so as to reciprocate the beaters $m$ and cause them to alternately strike the sack laterally and effect the packing of the flour.

The shaft $m^3$ is driven from any suitable source of power by means of the pulley $n$ which is loosely mounted upon the said shaft and is keyed thereto, when the starting-lever $g$ is depressed, by means of the clutch $n^1$ controlled by the fork $n^2$ attached to the two-armed lever $n^3$ one arm of which bears the weight $n^4$ and the other is provided with a tappet-roller $n^5$, adapted to be depressed or raised by means of the stops $o$, $o^1$ upon the link $d^1$ as the beam $b$ descends and rises; the oscillation of the two-armed lever $n^3$ by means of the stops $o$, $o^1$ puts the clutch $n^1$ into and out of gear in accordance with the movement of the beam $b$. The shaft $m^3$ is so weighted that when disconnected from the driving gear it automatically brings the beaters $m$ to the central position out of contact with the sack.

The operation of the machine is as follows, that is to say, assuming that a sack be secured to the holder $c$ and the proper weights placed upon the weight-plate $d$, the starting lever $g$ is depressed so as to raise the toggle-links $h$, $h^1$ into the position shown in Fig. 4. As above described, this operation of the toggle-links $h$, $h^1$ opens the valve $f^1$ and permits the beam to drop under the action of the loaded weight-plate $d$; the movement of the beam operates the pendent lever $l^1$ in the manner above mentioned so as to open the valve $f$. The parts of the apparatus are then in the position shown in Fig. 4 and the downward movement of the beam $b$ has also thrown the clutch $n^1$ into gear and started the reciprocation of the beaters $m$. The flour then flows from the hopper $e$ through the chute $e^1$ into the sack in which it is packed by the action of the beaters $m$ and this operation continues until the sack is approximately filled. At this point the beam $b$ descends to the horizontal position shown in Fig. 5, thus releasing the pendent lever $l^1$ and also permitting the valve $f$ to close and throw the clutch $n^1$ out of gear so that the beaters are stopped. Flour still continues to pass through the aperture $f^3$ in the said valve $f$ until the predetermined weight has been packed into the sack, whereupon the beam $b$ descends further and the projection $b^\times$ in connection with its inner end strikes the end of the trigger-device $k$ so as to disengage the arm $j$ thereof from the roller $g^3$ on the connecting-rod $g^2$. The latter, therefore, descends and releases the valve $f^1$ which immediately closes and finally cuts off the supply of flour to the sack. The parts are retained in the inoperative position until the starting-lever $g$ is again depressed.

The construction of machine illustrated in Figs. 6 and 7 is similar to that above described, the chief difference being in the mode of packing which is here effected by beating the bottom of the sack instead of the sides as in the above described construction of apparatus. The packer comprises the plate $q$ which is mounted beneath the sack upon an arm $q^1$ pivoted at $q^2$ in the frame of the apparatus and adapted to be oscillated by means of a cam $r$ which strikes the other end of the said arm $q^1$. This cam is mounted loosely upon the driving shaft $r^1$ and is keyed thereto when the packer is to be put into operation by means of the clutch $s$ operated by the two-armed lever $s^1$ one end of which is provided with a fork $s^2$ for moving the clutch and the other end is connected to a link $t$ attached to the underside of the weight plate $t^1$. The movement of the beam is thus transmitted to the clutch $s^2$ through the medium of the rod $t$ and the lever $s^1$ so as to put the clutch $s$ into and out of operation as required.

Figs. 8 and 9 are elevations illustrating the employment of a cover to prevent the spreading of dust from the sack holder inlet. This device comprises the cylindrical cover $u$ which is suitably fixed in the frame of the apparatus and has connected to its lower end by a piece of flexible material $v$ a conical mouth-piece $u^1$. The upper end of the sack holder $c$ bears against this conical mouth-piece $u^1$, when the beam is in the position it assumes as the sack is being filled. This position is shown in Fig. 8. When the supply is reduced to the dribble for the final weigh the sack-holder is lowered from the conical mouth-piece $u^1$ and thus allows the beam to be perfectly free for the final weigh, which is essential to the obtaining of accurate results.

Having now particularly described and ascertained the nature of our said invention and in what manner the same is to be performed, we declare that what we claim is:—

1. In automatic-feed weighing and packing apparatus the combination with a weigh-beam of a sack-holder suspended from one end thereof and a weight-plate suspended from the other end thereof, valve mechanism controlling the feed to the sack, a beater for packing the material in the sack, means for reciprocating the said packer and means operated by the movement of the beam for putting the packer into and out of operation, substantially as hereinbefore described.

2. In an automatic feed weighing and packing apparatus, the combination with weighing mechanism, provided with a support for the receptacle to be filled, of mechanism for feeding the material to be weighed into said receptacle, means for decreasing the supply of material to said receptacle during the final weigh, mechanism for packing the receptacle to be filled and mechanism for automatically starting said packing mechanism and stopping the same just prior to the final weigh, substantially as described.

3. In an automatic feed weighing and packing apparatus, the combination with weighing mechanism provided with a support for the receptacle to be filled, of a reciprocating beater adapted to come into contact with said receptacle, mechanism controlled by said weighing mechanism for automatically throwing said reciprocating beater into and out of operation, substantially as described.

4. In an automatic feed weighing and packing apparatus, the combination with weighing mechanism provided with a support for the receptacle to be filled, of a pair of reciprocating beaters adapted to alternately strike the receptacle to be filled on opposite sides, a revoluble shaft bearing, a cam for reciprocating said beaters, a continuously revolving shaft and mechanism operated by said weighing mechanism for automatically coupling and uncoupling said shafts to operate and stop said reciprocating beater, substantially as described.

5. In an automatic feed weighing and packing apparatus, the combination with weighing mechanism provided with a support for the receptacle to be filled, of a pair of reciprocating beaters adapted to alternately strike the receptacle to be filled on opposite sides, a revoluble shaft bearing a cam for reciprocating said beaters, a continuously revolving shaft, mechanism controlled by said weighing mechanism for automatically coupling and uncoupling said shafts to operate and stop said reciprocating beaters and means for retaining said beaters out of contact with said receptacle when the same are inoperative, substantially as described.

SIDNEY LEETHAM.
RICHARD EDMUND LEETHAM.

Witnesses:
R. C. LYMAN,
E. POOLE.